United States Patent [19]
Morris et al.

[11] Patent Number: 5,817,945
[45] Date of Patent: Oct. 6, 1998

[54] SYSTEM AND METHOD OF DETERMINING STRAIN

[75] Inventors: Martin Jesse Morris, Edwardsville, Ill.; Kirk Sullivan Schanze, Gainesville, Fla.

[73] Assignee: McDonnell Douglas

[21] Appl. No.: 631,955

[22] Filed: Apr. 15, 1996

[51] Int. Cl.[6] .................................................. G01L 1/24
[52] U.S. Cl. .................. 73/800; 73/794; 73/762
[58] Field of Search ............................ 73/760, 762, 766, 73/791, 800, 802, 794

[56] References Cited

U.S. PATENT DOCUMENTS

| | | | |
|---|---|---|---|
| 3,715,915 | 2/1973 | Williams | 73/800 |
| 4,849,668 | 7/1989 | Crawley et al. | 310/328 |
| 5,394,752 | 3/1995 | Reda | 73/800 |
| 5,490,426 | 2/1996 | Shiga et al. | 73/762 |
| 5,546,811 | 8/1996 | Rogers et al. | 73/762 |
| 5,559,358 | 9/1996 | Burns et al. | 73/579 |

FOREIGN PATENT DOCUMENTS

| | | | |
|---|---|---|---|
| 2194062 | 2/1988 | United Kingdom | 73/762 |

*Primary Examiner*—Richard Chilcot
*Assistant Examiner*—Max H. Noori
*Attorney, Agent, or Firm*—Dale B. Halling

[57] ABSTRACT

A system (50) for determining strain includes: a stimulating light source (54, 56); a device (64) for placing stress on an object (58); a number of local strain gauges (66) attached to the object (58); and an image capturing device (62, 64). A controller (52) is coupled to the stimulating light source (54, 56) and has a signal that turns on the stimulating light source (54, 56). The controller (52) receives a strain signal from each of the local strain gauges (66) located on the object (58). The controller (66) has an image signal that determines when the image capturing device (62, 64) captures an image.

19 Claims, 4 Drawing Sheets

SYSTEM AND METHOD OF DETERMINING STRAIN

FIELD OF THE INVENTION

The present invention relates to the field of strain measurements and more particularly to a system and method of determining strain.

BACKGROUND OF THE INVENTION

Measuring surface strain is a common method of evaluating local stresses and identifying stress concentrations on a structure. A number of methods exist for measuring strain at a point, including electrical resistance methods and electro-optic sensors. These solutions are cumbersome and cannot determine the stresses over the entire surface of the structure.

A number of full-field methods have been developed to overcome these limitations. Some of the full field methods that have been tried include brittle coatings, photoelastic coatings and moiré methods. All of these solutions suffer from limited sensitivity. In addition, the moiré method is restricted to flat surfaces. The brittle coatings are based on lacquers that are extremely toxic. The photoelastic coatings, while capable of being used on curved surfaces, are cumbersome, time consuming and yield only qualitative results.

Thus there exists a need for a method and system that can quantitatively measure full field strain on complex shapes.

SUMMARY OF THE INVENTION

A system that overcomes these problems includes: a stimulating light source; a device for placing stress on an object; a number of local strain gauges attached to the object; and an image capturing device. A controller is coupled to the stimulating light source and has a signal that turns on the stimulating light source. The controller receives a strain signal from each of the local strain gauges located on the object. The controller has an image signal that determines when the image capturing device captures an image.

DETAILED DESCRIPTION OF THE DRAWINGS

A system and method of determining strain uses a photoluminescent coating. The luminescence of the coating is dependent on the strain of the coating. When the coating is applied to a structure the strain of the coating is due to the strain in the structure.

Figure 1:
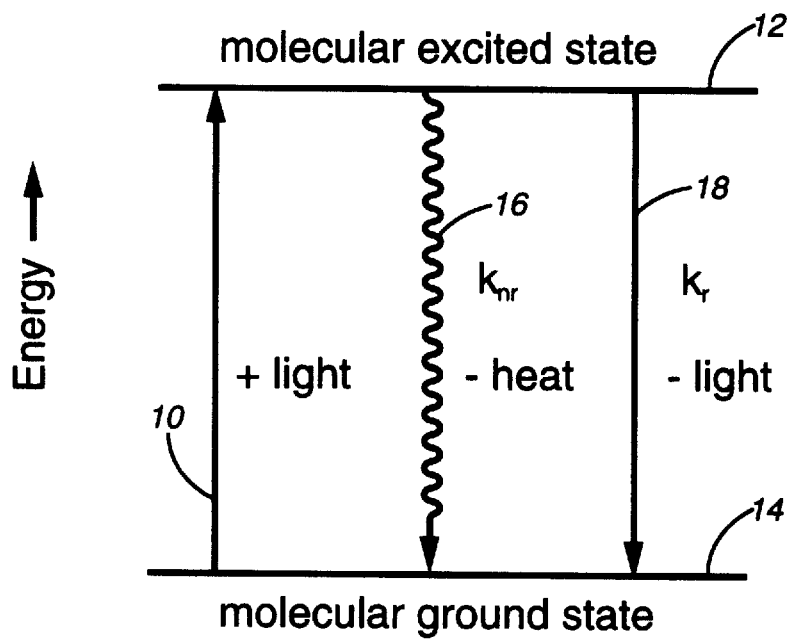
FIG. 1 is a schematic diagram of the energy states of a photoluminescent probe molecule.

The photoluminescent coating is made of a polymeric binder and a photoluminescent probe molecule. The invention exploits the two alternate decay mechanisms in the photoluminescent probe molecule to detect any changes in strain. FIG. 1 is a schematic diagram of the energy states of a photoluminescent probe molecule. The photoluminescent probe molecule is excited 10 by a photon to a higher energy state 12. This higher energy state 12 is a metastable state and as a result the photoluminescent probe molecule quickly decays back to its ground state 14. As shown in FIG. 1, the photoluminescent probe molecule can either lose its energy by a non-radiative decay 16 or by a radiative decay 18 mechanism. The radiative decay 18 results in a photon being emitted causing the coating to luminesce. In the absence of strain being applied to the coating there is a fixed relationship between the probability of the non-radiative decay 16 and the probability of the radiative decay 18. When a strain is applied to the coating the free volume available to the photoluminescent probe molecule is reduced. This reduces the probability that the photoluminescent probe molecule will decay by the non-radiative mechanism 16 and thereby increasing the probability that the photoluminescent probe molecule will decay by the radiative mechanism 18. As a result, the areas under strain will be brighter. In the preferred embodiment the polymeric binder adheres to a wide variety of surfaces and is a polydimethyl siloxane (i.e., a silicone rubber). In the preferred embodiment the photoluminescent probe molecule can be excited with light in the visible spectrum and luminesces in the visible spectrum. Examples of such photoluminescent probe molecules are donor-acceptor substituted diarylethylenes.

Figure 2:
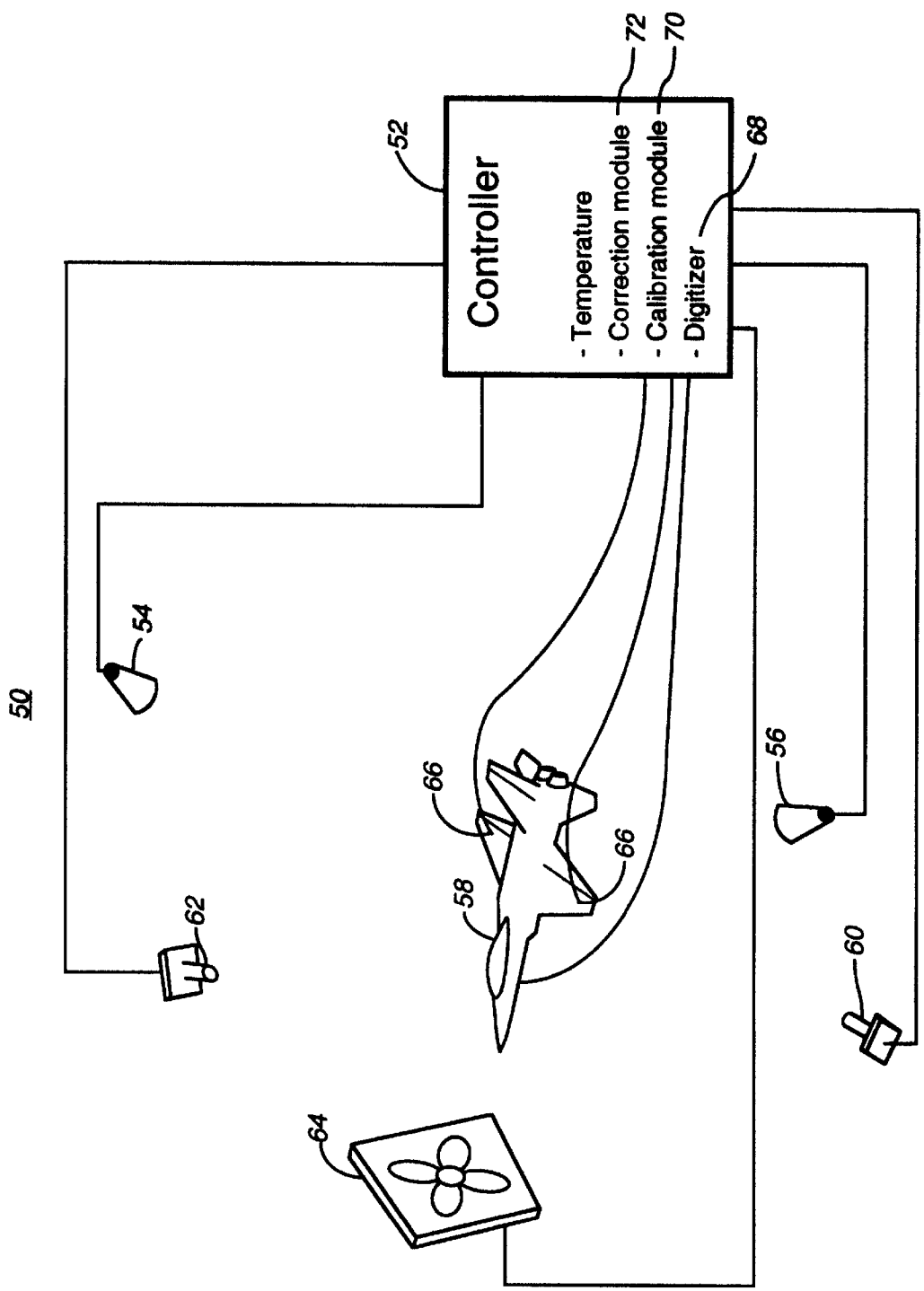
FIG. 2 is a block diagram of a system to determine strain.

FIG. 2 shows a system 50 that is capable of exploiting the properties of the photoluminescent probe molecule to measure the strain over the surface of a complex object. The system 50 has a controller 52 that is coupled to a stimulating light source (excitation light, stimulating light) 54, 56. The excitation lights 54, 56 are used to raise the photoluminescent probe molecule to the excited state 12. Multiple excitation lights 54, 56 can be used to insure that all surfaces of an object 58 are illuminated. The excitation lights 54, 56 are controlled by a signal from the controller 52 that turns on the lights 54, 56 for a predetermined period of time. The controller 52 is also coupled to an image capturing device (electronic camera) 60, 62. In one embodiment the image capturing device 60, 62 is a CCD (charge coupled device) camera. The controller 52 has an image signal that determines when the image capturing device 60, 62 captures an image (picture) of the luminescence intensity of the coating on the object 58. The controller 52 has a strain signal that controls a device for placing stress 64 on the object 58. In the embodiment shown in FIG. 1 the device for placing stress 64 is a wind generator. A plurality of local strain gauges 66 transmit a strain signal to the controller 52. In one embodiment a plurality of temperature sensors are also placed on the object 58. The temperature sensors can be co-located with the strain gauges. The output signal of the temperature sensors is connected to the controller.

In one embodiment the controller 52 has a plurality of processing modules, including a digitizer (digitizing device) 68, a calibration module 70, a temperature correction module 72. The digitizer 68 is used to digitize an analog picture from the electronic camera 54, 56 to form a digitized image. The calibration module 70 is used to convert the luminescence intensities of the images to strain levels. The calibration module 70 uses the inputs from the plurality of strain gauges 66 to form a conversion scale from luminescence intensity to strain level. The temperature correction module 72 adjusts the luminescence intensities for any changes in luminescence due to changes in the surface temperature of the object 58. This is necessary because the luminescence intensity of the coating is affected by changes is temperature. In one embodiment the temperature correction module 72 holds the temperature constant during the tests so that the images are captured at a single temperature.

Figure 3:
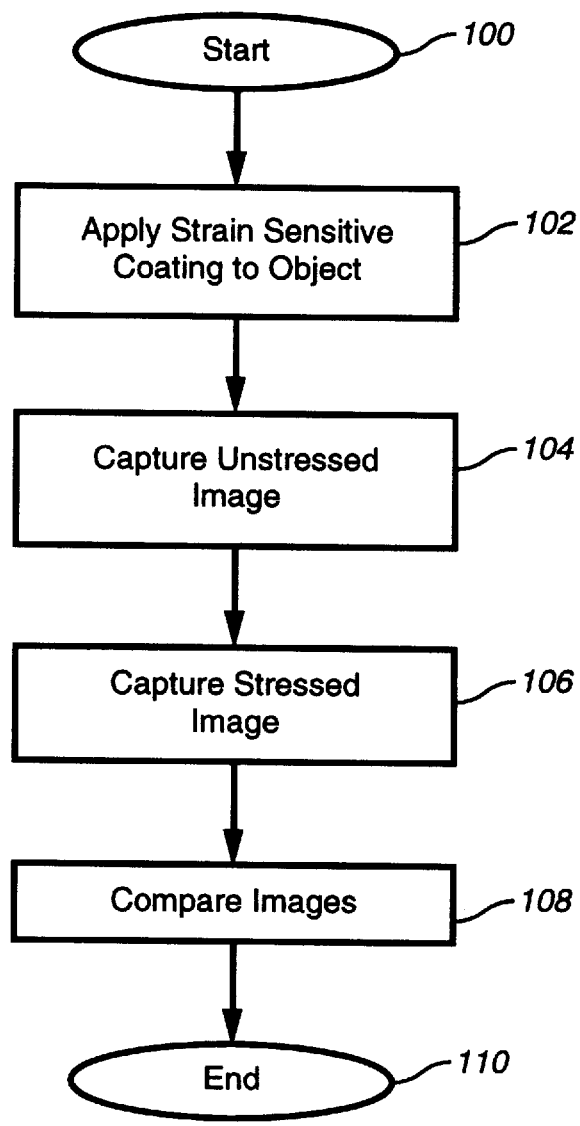
FIG. 3 is a flow chart of a process for determining strain.

FIG. 3 is a flow chart of a method for determining strain that can be implemented by the system of FIG. 2. The process starts, step 100, by applying the strain sensitive coating to the object at step 102 to form a coated object (painted object). Next, an image of the luminescence intensity of the object in an unstressed state is captured, to form an unstressed image (unstressed picture) at step 104. At step 106 an image of the luminescence intensity while the object is stressed is captured to form a stressed image (stressed picture). The stressed image and the unstressed image are compared at step 108 to determine the strain on the object, which ends the process, step 110.

Figure 4:
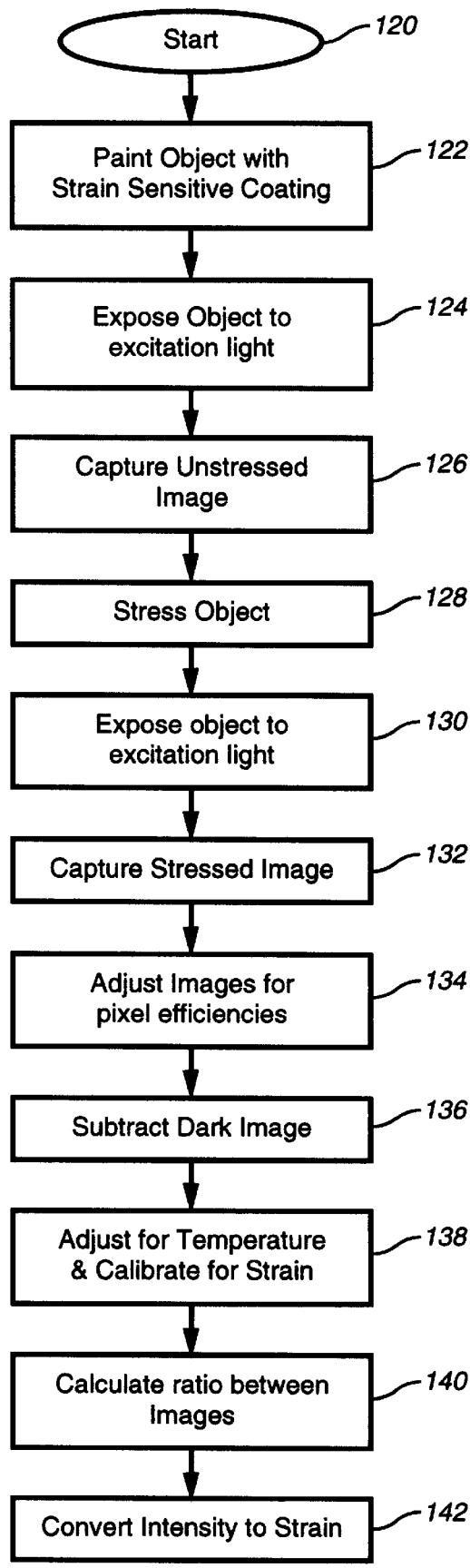
FIG. 4 is another flow chart of a process for determining strain.

FIG. 4 is a flow chart of another embodiment of a method for determining stress. The process starts, step 120, by painting the object with the strain sensitive coating at step 122. This object is then exposed to an excitation light for a predetermined period of time at step 124. An image of the luminescence intensity of the painted object is captured to form an unstressed image at step 126. The object is placed under stress at step 128. The stressed object is exposed to the excitation light for a predetermined period of time at step 130. Next, a stressed image of the luminescence intensity of the stressed object is captured at step 132. Both the stressed image and the unstressed image are adjusted for pixel to pixel efficiency variations at step 134. Next, a dark image is subtracted from both images at step 136 to form a normalized stressed image and a normalized unstressed image. The images are adjusted for differences in surface temperature (temperature of an object) and the luminescence intensities are calibrated to strain levels at step 138. In one embodiment the images are next aligned to each other on a pixel by pixel basis to form a pair of aligned images. Next, the ratios of the luminescence intensities of the two images are calculated (luminescence intensity ratios) at step 140 to form a ratio image (strain image). Finally the ratio intensities are converted to strain levels on the ratio image at step 142. Thus using this process the full field strain of a complex curved object can be determined quantitatively.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of determining strain, comprising the steps of:
   (a) applying a strain sensitive polymeric coating to an object to be tested to form a coated object;
   (b) capturing an image of a non-zero luminescence intensity of the coated object in an unstressed state, to form an unstressed image;
   (c) capturing a stressed image of the luminescence intensity of the coated objected when a stress has been applied to the coated object, where the luminescence intensity varies as the strain of the object is increased and decreased; and
   (d) comparing the unstressed image to the stressed image to determine the strain on the object.

2. The method of claim 1, wherein step (a) includes the steps of:
   (a1) mixing a photoluminescent probe molecule in a polymeric binder to form the strain sensitive polymeric coating;
   (a2) painting the object with the strain sensitive polymeric coating.

3. The method of claim 1, wherein step (b) includes the step of:

(b1) exposing the coated object to a stimulating light for a predetermined period of time.

4. The method of claim 3, further including the steps of:
   (b2) taking a picture of the luminescence intensity of the coated object with an electronic camera to form an unstressed picture;
   (b3) digitizing the unstressed picture to form the unstressed image.

5. The method of claim 4, wherein step (c) includes the steps of:
   (c1) exposing the coated object to the stimulating light for a predetermined period of time;
   (c2) stressing the coated object;
   (c3) taking a picture of the luminescence intensity of the coated object with the electronic camera to form a stressed picture;
   (c4) digitizing the stressed picture to form the stressed image.

6. The method of claim 5, wherein step (d) includes the step of:
   (d1) dividing the stressed image by the unstressed image to form a strain image.

7. The method of claim 1, wherein step (c) includes the step of:
   (c1) capturing the stressed image and the unstressed image at a single temperature.

8. A system for determining strain comprising:
   a stimulating light source;
   a device for placing stress on an object;
   a plurality of local strain gauges attached to the object;
   an image capturing device; and
   a controller coupled to the stimulating light source and having a signal that turns on the stimulating light source, the controller receiving a strain signal from each of the plurality of local strain gauges and the controller having an image signal that determines when the image capturing device captures an image.

9. The system of claim 8, further including a digitizing device that digitizes the image.

10. The system of claim 9, wherein the object is covered with a strain sensitive coating.

11. The system of claim 10, wherein the strain sensitive coating comprises a photoluminescent probe molecule suspended in a polymeric binder.

12. The system of claim 11, wherein the image capturing device is a CCD camera.

13. The system of claim 12, wherein the controller includes a calibration module.

14. The system of claim 8, further including a plurality of temperature sensors attached to the object and each of the plurality of temperature sensors having an output signal coupled to the controller.

15. The system of claim 14, wherein the controller further includes a temperature correction module.

16. A method of determining strain; comprising the steps of:
   (a) painting a complex object with a strain sensitive polymeric coating to form a painted object, where the luminescence intensity varies as the strain of the object is increase and decreased;
   (b) exposing the painted object to an excitation light;
   (c) capturing an image of a non-zero luminescence intensity of the painted object to form an unstressed image;
   (d) stressing the painted object to form a stressed object;

(e) exposing the stressed object to the excitation light;

(f) capturing a stressed image of the luminescence intensity of the stressed object; and (g) comparing the stressed image to the unstressed image to determine the strain of the object.

17. The method of claim 16, wherein step (g) includes the steps of:

(g1) adjusting the stressed image and the unstressed image for a pixel to pixel efficiency variation;

(g1) subtracting a dark image from the stressed image and from the unstressed image to form a normalized stressed image and a normalized unstressed image.

18. The method of claim 16, wherein step (g) includes the steps of:

(g1) aligning the stressed image to the unstressed image on a pixel by pixel basis to form a pair of aligned images;

(g2) determining a luminescence intensity ratio between the pair of aligned images to form a strain image.

19. The method of claim 16, wherein step (g) includes the step of:

(g1) adjusting the stressed image and the unstressed image for a temperature of the object.

* * * * *